No. 671,011. Patented Apr. 2, 1901.
C. CARR.
BOTTLE CLOSURE.
(Application filed Aug. 15, 1899.)
(No Model.)

WITNESSES:
Ella L. Giles
O. Drummer

INVENTOR
Caroline Carr
BY Richardson
ATTORNEYS

UNITED STATES PATENT OFFICE.

CAROLINE CARR, OF SUNDERLAND, ENGLAND.

BOTTLE-CLOSURE.

SPECIFICATION forming part of Letters Patent No. 671,011, dated April 2, 1901.

Application filed August 15, 1899. Serial No. 727,271. (No model.)

*To all whom it may concern:*

Be it known that I, CAROLINE CARR, a subject of the Queen of Great Britain and Ireland, and a resident of Sunderland, in the county of Durham, England, have invented certain new and useful Improvements in Closing Bottles, Jars, and Like Vessels to Prevent Fraudulent Refilling or Interference, of which the following is a specification.

My invention relates to the closing of bottles, jars, and like vessels to prevent fraudulent refilling or interference, and has for its object to effect the purpose in a simple and efficient manner.

The invention consists in furnishing about the top of the neck or equivalent part of the bottle or vessel bifurcations to jointly receive and retain a lid or cover in such manner that when once the lid is fitted it cannot be displaced without damage to itself or the surroundings, thus rendering improper tampering at once apparent and in this way obviating unauthorized opening, which may be further insured by locking the lid in position by a catch device or devices constructed to be incapable of unfastening after once being fastened. The lid or cover may constitute the only closing means or it may be auxiliary to the ordinary cork or other means, in which event the neck or like part of the bottle or vessel beyond the cork will be adapted to receive the lid or cover.

In order that my invention may be fully understood and carried into practice, I will describe it in reference to the accompanying drawings, which illustrate its application, by way of example, to a spirit-bottle closed also by an ordinary cork.

Figure 1:
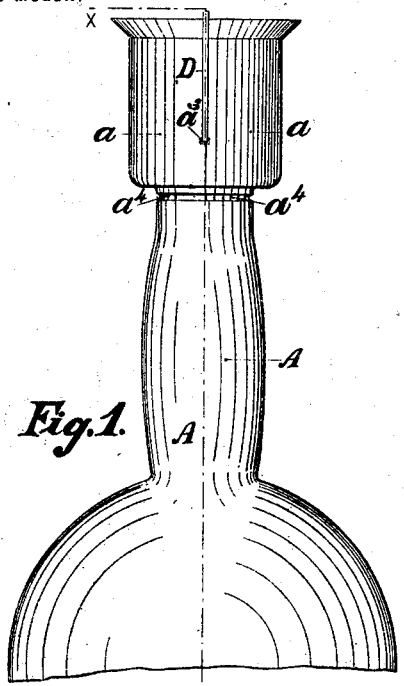
Figure 3:
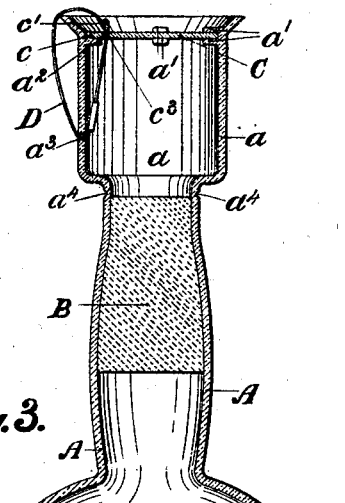
Figure 2:
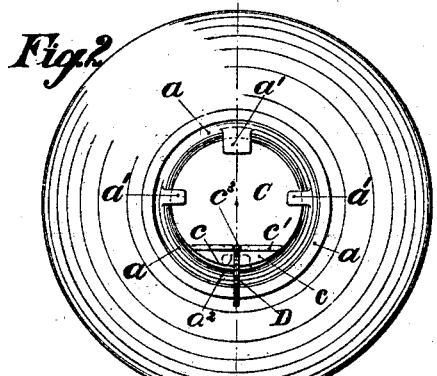
Figure 4:
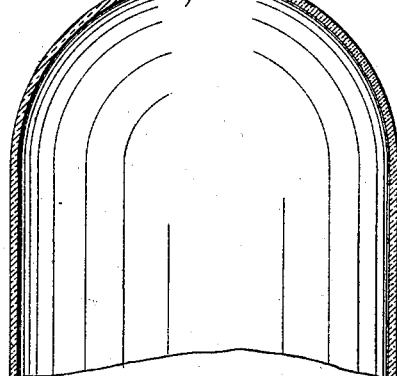
Figure 6:
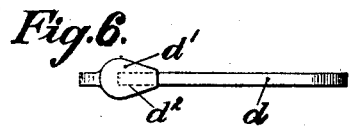
Figure 7:
Figure 8:
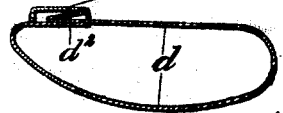
Figure 5:
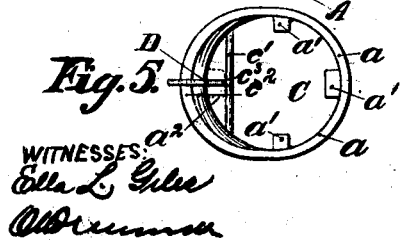

Of the drawings the first three figures show one arrangement of the parts comprising my invention assembled for use, Figure 1 being an elevation, Fig. 2 a plan, and Fig. 3 a central vertical section on the line X X in the previous figures. Fig. 4 is a central vertical section, and Fig. 5 is a plan, of a modified arrangement. Figs. 6, 7, and 8 are respectively a plan, a side elevation, and a section, on a larger scale, of the catch device shown in the preceding figures.

A is the bottle-neck, and B the usual cork, and according to my invention in this application I form an extension $a$ of the neck A beyond the usual corking-level, and about the top of this part $a$ I provide within it, at suitable intervals, bifurcations $a'$ $a'$ $a'$ to jointly serve as a seat for a lid or cover C, closing the extension $a$, the bifurcations being disposed, as shown in Figs. 3 and 4, to receive and support the lid-margin, which is made of a thickness not much less than the depth of the space at each bifurcation. The extension $a$ is made of larger diameter than the neck A, and the bifurcations $a'$ $a'$ $a'$ are spaced apart for the purpose of admitting of the free corking of the bottle, which of course is performed before the lid C is fitted.

To place the lid C in position one portion of it is inserted in the extension $a$ and manipulated until its margin enters the bifurcations $a'$ $a'$ $a'$, and to render this fitment easy the lid is reduced in diameter or size at a part $c$, Figs. 2 and 3, and is furnished with a handle $c'$, while to further this end the top or mouth of the extension $a$ is preferably flared, as in Figs. 1, 2, and 3, which also aids more effective closure.

Instead of the top of the extension $a$ being flared all around, as illustrated in Figs. 1, 2, and 3, it may only be partially bell-mouthed, as shown at $c^2$ in Figs. 4 and 5, or, as it were, spouted, in which event the lid C need not be reduced in diameter or size, because the part $c^2$ serves the same purpose.

To adequately support the lid C, I recommend the provision of a ledge $a^2$ within the part $a$, as represented in Figs. 2, 3, 4, and 5. Thus it will be evident that when once the lid C is fitted between the bifurcations $a'$ $a'$ $a'$ it cannot be removed, since there is no room to admit of it being properly manipulated without fracturing either itself or one or more of the bifurcations $a'$ $a'$ $a'$. Hence immunity from fraud accrues, as the attention of a purchaser is at once drawn to the broken or damaged part or parts.

If desired, the space intervening between the top of the lid C and the top of the extension $a$ may be filled with a suitable cement, which not only adds to the security, but also serves to maintain tightness.

As an additional preventative against tampering I secure the lid C in position by a catch device D, passing through a hole $c^3$ in the lid and a hole $a^3$ in the extension $a$. A convenient catch consists, as shown best in Figs. 6, 7, and 8, of a resilient strip $d$, having at one end a hollow head $d'$ and at the other a catch $d^2$ for engaging the head $d'$, but not capable of being disengaged ordinarily. The head $d'$ is larger, but the strip $d$ and catch $d^2$ are smaller, than the holes $c^3$ and $a^3$, and for use the head $d'$ is situated inside the extension $a$, and the catch end of the strip $d$ is passed to the exterior thereof and over and through the lid C into the extension $a$ again, whereupon it is manipulated until engagement of the head $d'$ and catch $d^2$ results, and when this is effected fraudulent interference is further prevented. Either the lid C or extension $a$ is best made transparent to facilitate the said engagement. Appropriately the hole $c^3$ is disposed in close proximity to the handle $c'$, which thereby acts as an impediment to tampering with the catch D, which may be also hindered by cementing the holes $a^3$ and $c^3$. There may be several such fastenings, the size of the bottle or vessel determining the number, if one be thought not sufficient.

The bottle is opened in the way common to this type—that is to say, a groove or channel $a^4$ is formed in the bottle-neck A, preferably immediately below the extension $a$, to permit its severance by means of a diamond or by a blow.

As will be obvious, when the ordinary closing means are not adopted then the part $a$ replaces or may replace the neck A, or, in other words, the latter is fashioned after the manner of the former, such being applicable to jars or large bottles for containing preserved fruits, tea, confectionery, &c.

From this example of how my invention may be carried into practice other applications will be readily understood, because in all cases the bifurcations $a'$ $a'$ $a'$, lid C, and fastening device D will be practically the same, though their disposition may require some variation to meet particular bottles or vessels.

What I claim as my invention, and desire to secure by Letters Patent, is—

1. In combination, the bottle having at its mouth bifurcations or lugs, a lid fitting between the lugs and a fastener passing through a hole in the lid and through a hole in the bottle-wall with its ends meeting within the bottle below the lid, said ends being attached by a catch, substantially as described.

2. In combination, the bottle having bifurcations or lugs at its mouth, a disk lid fitting between and engaging the lugs, to be held by said engagement and a fastening device passing through an opening in the lid and through an opening in the bottle-wall independent of the lugs, substantially as described.

In witness whereof I have hereunto set my hand in the presence of two witnesses.

CAROLINE CARR.

Witnesses:
JAMES ANDREW HARVEY,
EDMUND WARD PATTISON.